United States Patent
Axnäs et al.

(10) Patent No.: US 11,818,674 B2
(45) Date of Patent: *Nov. 14, 2023

(54) BEAM-SCAN TIME INDICATOR (71) Applicant: Telefonaktiebolaget LM Ericsson (publ), Stockholm (SE)

(72) Inventors: Johan Axnäs, Solna (SE); Kumar Balachandran, Pleasanton, CA (US); Icaro Leonardo Da Silva, Solna (SE); Dennis Hui, Sunnyvale, CA (US); Andres Reial, Lomma (SE); Johan Rune, Lidingö (SE); Henrik Sahlin, Mölnlycke (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 89 days.

This patent is subject to a terminal disclaimer.

(21) Appl. No.: 17/569,185

(22) Filed: Jan. 5, 2022

(65) Prior Publication Data

US 2022/0132451 A1    Apr. 28, 2022

Related U.S. Application Data

(63) Continuation of application No. 16/746,045, filed on Jan. 17, 2020, now Pat. No. 11,240,771, which is a
(Continued)

(51) Int. Cl.
*H04W 56/00* (2009.01)
*H04W 72/0446* (2023.01)

(52) U.S. Cl.
CPC ... *H04W 56/0015* (2013.01); *H04W 72/0446* (2013.01)

(58) Field of Classification Search
None
See application file for complete search history.

(56) References Cited

U.S. PATENT DOCUMENTS 6,456,610 B1    9/2002  Briley
6,771,300 B2    8/2004  Amada et al.
(Continued)

FOREIGN PATENT DOCUMENTS

CN    102224687 A    10/2011
CN    103931152 A    7/2014
(Continued)

OTHER PUBLICATIONS

Barati, C. Nicolas, et al., "Directional Cell Search for Millimeter Wave Cellular Systems", Apr. 20, 2014, 1-10.
(Continued)

*Primary Examiner* — Gregory B Sefcheck
(74) *Attorney, Agent, or Firm* — Murphy, Bilak & Homiller, PLLC (57) ABSTRACT

The present disclosure relates to transmitting synchronization signals and in particular to so called beam sweep. In particular the disclosure relates to methods for providing synchronization using synchronization sequences that are transmitted at different points in time. The disclosure also relates to corresponding devices and computer programs. A method in a network node, for transmitting synchronization sequences of a synchronization signal to one or more receiving wireless devices, comprises determining multiple synchronization sequences, such that each synchronization sequence comprises a respective timing indication, whereby each synchronization sequence enables determination of a time of an event in a receiving wireless device and transmitting the synchronization sequences to the one or more wireless devices, at different points in time.

14 Claims, 7 Drawing Sheets

Related U.S. Application Data continuation of application No. 14/925,170, filed on Oct. 28, 2015, now abandoned.

(56) References Cited

U.S. PATENT DOCUMENTS

| | | | |
|---|---|---|---|
| 7,206,610 | B2 | 4/2007 | Iacono et al. |
| 8,024,001 | B2 | 9/2011 | Iacono et al. |
| 8,265,702 | B2 | 9/2012 | Iacono et al. |
| 9,078,268 | B2 | 7/2015 | Jung |
| 9,215,650 | B2 | 12/2015 | Jung |
| 9,497,047 | B2 | 11/2016 | Josiam et al. |
| 9,544,919 | B2 | 1/2017 | Kim et al. |
| 9,661,592 | B2 | 5/2017 | Seol et al. |
| 9,678,205 | B2 | 6/2017 | Hope |
| 9,794,902 | B2 | 10/2017 | Shen et al. |
| 9,923,682 | B2 | 3/2018 | Jeong et al. |
| 10,148,419 | B2 | 12/2018 | Lee et al. |
| 10,271,295 | B2 | 4/2019 | Tsai et al. |
| 10,547,418 | B2 | 1/2020 | Ryu et al. |
| 2012/0008608 | A1 | 1/2012 | Iacono et al. |
| 2013/0064239 | A1 | 3/2013 | Yu et al. |
| 2013/0217404 | A1 | 8/2013 | Jung |
| 2015/0358129 | A1 | 12/2015 | Ryu et al. |
| 2016/0323075 | A1 | 11/2016 | Jeong et al. |
| 2017/0026962 | A1 | 1/2017 | Liu et al. |
| 2017/0244460 | A1 | 8/2017 | Li et al. |
| 2018/0092053 | A1 | 3/2018 | Lee et al. |
| 2018/0145861 | A1 | 5/2018 | Lee et al. |
| 2018/0176065 | A1 | 6/2018 | Deng et al. |
| 2019/0052434 | A1* | 2/2019 | Zhou ................. H04W 72/0446 |
| 2019/0159152 | A1* | 5/2019 | Liu ..................... H04W 72/046 |
| 2019/0334604 | A1* | 10/2019 | Kusano ................. H04W 52/02 |
| 2020/0053800 | A1 | 2/2020 | Deng et al. |
| 2020/0252891 | A1* | 8/2020 | Chendamarai Kannan ................. H04W 56/001 |
| 2020/0288421 | A1* | 9/2020 | Kim .................... H04W 72/046 |
| 2021/0307031 | A1* | 9/2021 | Chen .................... H04W 28/02 |
| 2021/0321276 | A1* | 10/2021 | Kim ................. H04W 72/0453 |

FOREIGN PATENT DOCUMENTS

| | | |
|---|---|---|
| CN | 104919885 A | 9/2015 |
| JP | 2010502084 A | 1/2010 |
| JP | 2014532320 A | 12/2014 |
| JP | 2015041818 A | 3/2015 |
| KR | 20130043078 A | 4/2013 |
| RU | 2436230 C2 | 12/2011 |
| RU | 2459366 C1 | 8/2012 |
| WO | 2015025839 A1 | 2/2015 |
| WO | 2015080646 A1 | 6/2015 |
| WO | 2015080649 A1 | 6/2015 |
| WO | 2015147717 A1 | 10/2015 |

OTHER PUBLICATIONS

Deng, et al., "Millimeter Wave Initial Cell Search Analysis Under WTRU Rotational Motion", U.S. Appl. No. 62/184,580, filed Jun. 25, 2015.

* cited by examiner

BEAM-SCAN TIME INDICATOR

RELATED APPLICATIONS

This application is a continuation of U.S. application Ser. No. 16/746,045 filed on 17 Jan. 2020, now U.S. Pat. No. 11,240,771 issued on 1 Feb. 2022, which is a continuation of U.S. application Ser. No. 14/925,170 filed on 28 Oct. 2015 and now abandoned. The entire contents of each aforementioned application is incorporated herein by reference.

TECHNICAL FIELD

The present disclosure relates to transmitting synchronization signals and in particular to so called beam sweep. In particular the disclosure relates to methods for providing synchronization using synchronization sequences that are transmitted at different points in time. The disclosure also relates to corresponding devices and computer programs.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex (FDD) and Time Division Duplex (TDD) modes.

When a User Equipment, UE, wishes to connect to a wireless communication system, for example after power-on of the UE or when waking up after an extended sleep period, it goes through an initial-access procedure. The first step of this procedure is typically that the UE searches for and detects a synchronization signal, comprising synchronization sequences that are regularly broadcasted by the network access nodes, ANs, also referred to as base stations or network nodes. Note that synchronization signal is not unambiguously used in prior art. In this disclosure the term synchronization signal is used to refer to all the synchronization sequences that are regularly broadcasted by the access nodes. In other words, the synchronization signal is the sum of the periodically repeated sequences. The synchronization signal allows the UE to align with the network in time and frequency, i.e. learn where the boundaries in time between the symbols (e.g. OFDM symbols) are, and ensure that it uses, within a small tolerance, the same carrier frequency as the network. Such alignment in time and frequency is essential for subsequent communication. In LTE, on synchronization sequence may be sufficient for the UE to align but in some cases the UE will need to use several synchronization sequences. To use several synchronizations sequences is not a problem since the synchronization sequences are retransmitted regularly. After successful alignment, the UE may, depending on the type of system, be supposed to listen for additional information from the network, e.g. so-called system information, and/or respond with a request to join the network, often referred to as physical random access channel message, or Physical Random Access Channel, PRACH message. The UE is typically not allowed to send the request to join at an arbitrary time, since that could conflict with other transmissions in the system, but should rather send it at a predefined time interval after the synchronization signal was received. The UE typically also knows at what time interval after the synchronization signal it could expect to find the additional information (if any), thereby reducing the complexity of the search and detection of the additional information.

In some systems, the UE might not respond directly with a request to join the network, but might instead only request from the network to send some additional system information, or only send an Uplink, UL, synchronization signal to achieve synchronization on the UL (in a system with a significant propagation delay, Downlink, DL, synchronization does not automatically guarantee UL synchronization). For generality, we will henceforth refer to any UL signaling in response to the DL synchronization signal (including, but not limited to a request to join the network, request for additional system information, or an UL synchronization signal) as the UL signal.

A procedure similar to the initial-access procedure may also be performed when a UE wants to make a handover, i.e. it is already connected to the system, but wishes to connect to another access node, AN.

Future systems are expected to make heavy use of high-gain narrow beamforming, which will enable high-data-rate transmission coverage also to very distant users and/or in higher frequency bands which would not realistically be covered with normal sector-wide beams, which have lower antenna gain.

In order for the initial-access procedure not to be the coverage-limiting factor in such systems, the synchronization signal will typically also have to use high-gain narrow beams. This means that the AN will typically have to transmit the synchronization signal multiple times, in different directions, to cover the geographical area to be served by an access node, AN. With typical antenna configurations envisioned for the next generation communication systems, sometimes referred to as 5G systems, a narrow beam may cover only a small fraction of the entire geographical area (e.g. 1%) at a time, and consequently it may take substantial time to transmit the beam in all directions needed, one or a few directions at a time.

The AN could in principle, depending on hardware configuration, transmit the synchronization signal in many directions at the same time, but given a maximum total output power of the AN, such simultaneous transmission would be at the expense of proportionally reduced power per beam, i.e. effectively reduce the coverage. This could be compensated for by over-dimensioning the hardware such that excessive total output power is available, but this would undesirably increase the cost of the equipment. The procedure of sequentially transmitting the beam in all necessary directions is referred to as a beam sweep or beam scan. "Necessary directions" here means all directions where coverage is desired.

The UE may hear any of the many transmissions of the synchronization signal during the beam sweep, and the network will not know which one the UE heard. This means that if the UE is supposed to send a system access request, e.g. using PRACH, a certain time after hearing a synchronization beam transmission, which is a typical random access request procedure, then the network has to listen for a UL signal at multiple time instances in a given direction, and/or the UE has to transmit its UL signal at multiple time instances. Also, it means that the UE has to listen for any additional information necessary to access the system, e.g. system information, at multiple time instances and/or the network has to transmit additional information at multiple time instances. All the mentioned cases lead to inefficient use of radio resources. In particular, this is the case since a node may at any one time typically only listen to a limited number of signals, and in half-duplex TDD systems (a typical choice for future wireless communication systems) the node cannot transmit any signals at all while listening.

The article "Directional Cell Search for Millimeter Wave Cellular Systems" by C. Nicolas Barati et. al. has addressed the problem of the detection by the mobile terminal of a beam-based synchronization signal. The authors propose the base station to periodically transmit synchronization signals in random directions to scan the angular space and a detection algorithm based on maximum likelihood is proposed where the mobile can detect the strongest direction.

However, known references do not address the joint problem of the AN transmitting synchronization signals using beamforming, the mobile terminal detecting these signals and transmitting system access requests, e.g. RACH request, and the AN detecting these attempts from the terminal.

SUMMARY

An object of the present disclosure is to provide methods and devices which seek to mitigate, alleviate, or eliminate one or more of the above-identified deficiencies in the art and disadvantages singly or in any combination.

This is obtained by a method for use in a network node, for transmitting synchronization sequences of a synchronization signal to one or more receiving wireless devices. The method comprises determining multiple synchronization sequences, such that each synchronization sequence comprises a respective timing indication. Thereby, each synchronization sequence enables determination of a time of an event in a receiving wireless device and transmitting the synchronization sequences to the one or more wireless devices, at different points in time. By providing a timing indication in each synchronization sequence, the wireless device can derive a more precise time of an event, so that it can react accordingly. In a system using beam sweeps, the timing indication provides a way for the wireless device to synchronize to the network node. The event is for example a network node listening for a system access request from the wireless device. In that particular case, the wireless device uses the timing indication to determine when to send the system access request. The wireless device does then not have to transmit its uplink, UL, signal at multiple time instances. It also does not need to listen for any additional information necessary to access the system, e.g. system information, at multiple time instances and/or the network does not have to transmit additional information at multiple time instances.

According to some aspects, the multiple synchronization sequences are time dependent versions of a synchronization signal referring to one particular event. By providing time dependent versions of a synchronization signal, the fact that the beam sweep transmits signals at different times can be compensated for.

According to some aspects, the method further comprises determining a time of the event. The time may be used when providing the timing indication in the multiple synchronization sequences.

According to some aspects, the synchronization sequences are transmitted in different directions. Thus, wireless devices located at different directions from the network node receives the synchronization signal in the form of synchronization sequences, which have been transmitted in different directions. The wireless devices can then use the timing indication in the synchronization sequence to synchronize the event with the network node.

According to some aspects, the transmission of the synchronization sequences constitutes a beam sweep, i.e. the synchronization sequences are transmitted in several directions from the network node. The network thus uses high-gain narrow beamforming, which will enable high-data-rate transmission coverage also to very distant users which would not realistically be covered with normal sector-wide beams, which have lower antenna gain.

According to some aspects, the timing indications are relative to a time of transmission of the respective synchronization sequence. When the timing indication is relative to the time of transmission it is easy for the wireless device to determine when the time of the event is.

According to some aspects, the timing indications are relative to a reference clock. When using a reference clock, it is possible to give a precise timing indication by referring to the reference clock.

According to some aspects, the event is a time of a reserved time slot where the wireless device is allowed to transmit. I.e. the event is a time when the network node listens for a UL signal from the wireless device. Thus, the wireless device is informed of when it is possible to transmit to the network node.

According to some aspects, the reserved time slot is a random access window. Hence, the wireless device is informed of when to send random access packets.

According to some aspects, the event is a time of a further transmission from the network node.

According to some aspects, the timing indications are encoded into the synchronization sequence. According to some aspects, the synchronization sequences are determined to comprise a synchronization sequence from a set of dissimilar synchronization sequences, and wherein each of the dissimilar synchronization sequences in the set is mapped to a respective point in time or to a timing. When different synchronization sequences are transmitted in different directions and at different times and when they are dissimilar, the receiving wireless device can infer a value for the timing indication. In other words, the timing indication is implicit in the distinct synchronization sequences.

According to some aspects, each synchronization sequence is mapped to a time or timing by an index. It is then possible to determine the time or timing by looking up the index in for example a table.

According to some aspects, the disclosure also relates to a network node in a cellular communication network configured for transmitting synchronization sequences of a synchronization signal to one or more receiving wireless devices. The network node comprises a communication interface and processing circuitry. The processing circuitry is configured to cause the network node to determine multiple synchronization sequences, such that each synchronization sequence comprises a respective timing indication, whereby each synchronization sequence enables determination of a time of an event in a receiving wireless device and to transmit the synchronization sequences to the one or more wireless devices, at different points in time. The network node is further configured to perform all the aspects of the method in a network node described above and below.

According to some aspects, the disclosure also relates to a computer program comprising computer program code which, when executed in a programmable controller of a network node, causes the network node to execute the methods described above and below.

The object of the disclosure is further obtained by a method for use in a wireless device, for receiving one or more synchronization sequences of a synchronization signal. The method comprises monitoring a spectrum for synchronisation sequences and when a first synchronisation sequence is detected then obtaining, by analysing the content of the detected first synchronisation sequence, a timing indication defining a time of an event. Then the wireless device is informed of the time of an event so that it can react accordingly. As previously discussed, this enables that the wireless device does not then have to transmit its uplink, UL, signal at multiple time instances. It also does not need to listen for any additional information necessary to access the system, e.g. system information, at multiple time instances and/or the network does not have to transmit additional information at multiple time instances.

According to some aspects, the method comprises receiving a second synchronization sequence, wherein the first and the second synchronization sequences define the same time. The synchronization sequences may comprise different timing indications but define the same time. This is useful for example if the event is an event which occurs at the same time for all wireless devices in all directions from the network node.

According to some aspects, the method comprises performing a transceiver operation at the time defined by the timing indication.

According to some aspects, the timing indications are relative times to a time of a transmission of the respective synchronization sequence. When the timing indication is relative to the time of transmission it is easy for the wireless device to determine when the time of the event is.

According to some aspects, the timing indications are relative to a reference clock. When using a reference clock, it is possible to give a precise timing indication by referring to the reference clock.

According to some aspects, the event is a time of a reserved time slot where the wireless device is allowed to transmit. I.e. the event is a time when the network node listens for a UL signal from the wireless device. Thus, the wireless device is informed of when it is possible to transmit to the network node.

According to some aspects, the reserved time slot is a random access window. Hence, the wireless device is informed of when to send random access packets.

According to some aspects, the event is a time when the wireless device is requested to listen for further transmission from the network node. Thus, the wireless device does not need to listen for any additional information at multiple time instances.

According to some aspects, the timing indications are encoded into the synchronization sequences and wherein the analyzing comprises decoding the synchronization sequence.

According to some aspects, the wireless device monitors the spectrum for several dissimilar synchronization sequences, and wherein each of the dissimilar synchronization sequences is mapped to a respective point in time or to a timing. Since the wireless device does not initially know in which direction from the network node it is located in, and thus which synchronization sequence transmission it may receive, it monitors a spectrum of several possible transmissions.

According to some aspects, each synchronization sequence is mapped to a time or timing by an index and wherein the obtaining comprises retrieving a time of timing using the index. It is then possible to determine the time or timing by looking up the index in for example a table. By knowing the time or timing, the time of the event is given.

According to some aspects, the disclosure also relates to a wireless device being configured for receiving one or more synchronization sequences of a synchronization signal. The wireless device comprises a communication interface and processing circuitry. The processing circuitry is configured to cause the wireless device to monitor a spectrum for synchronisation sequences; and when a first synchronisation sequence is detected then to obtain, by analysing the content of the detected first synchronisation sequence, a timing indication defining a time of an event. The wireless device is further configured to perform all the aspects of the method in a wireless device described above and below.

According to some aspects, the disclosure also relates to a computer program comprising computer program code which, when executed in a programmable controller of a wireless device, causes the wireless device to execute the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The apparatuses and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Access node, AN, radio network node and network node are used interchangeably throughout the disclosure.

A synchronization signal is a predefined signal that allows a receiving device to align (its master clock) with the transmitting device in time and/or frequency, i.e. learn where the boundaries in time between the symbols (e.g. OFDM symbols) are, and ensure that the receiver uses, within a small tolerance, the same carrier frequency as the transmitter. Such alignment in time and frequency is essential for digital radio communication.

Figure 1:
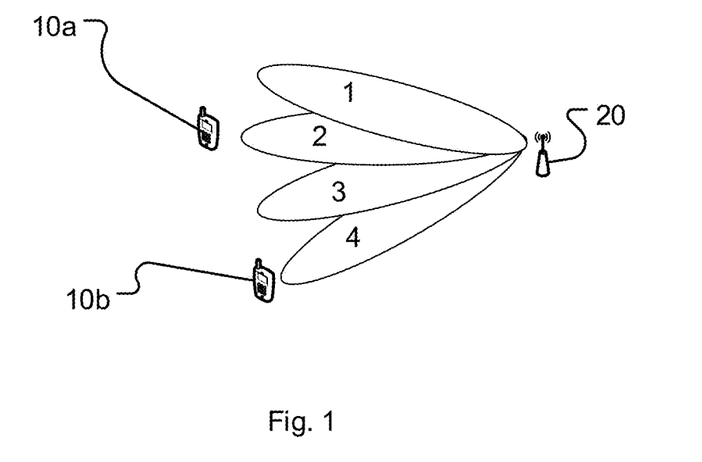
FIG. 1 is illustrating a network node transmitting in different directions and two wireless devices receiving different beams.

As discussed in the background, future systems are expected to make heavy use of high-gain narrow beamforming. When using beam forming, a wireless device communicating with the network node using beam forming will not know when to listen or transmit to the network node; i.e. when the beam is directed towards the wireless device. An example of a network node 20 transmitting several directed beams 1, 2, 3, 4 in a beam sweep and two receiving wireless devices 10a, 10b are illustrated in FIG. 1.

The beam sweep may serve other purposes than just time and frequency synchronization; in particular, the sweep may also serve the purpose of determining the best beam direction for data transmission to the new UE. In such cases, the beam may contain some information that uniquely identifies the synchronization beam, so that the UE can report to the AN which beam that was best received. Here, the best beam can be characterized by several alternative measures, for example the one received with highest power, largest signal to noise ratio, smallest time of arrival (indicating closest AN) or first received power over a threshold. This can be seen as a sort of spatial synchronization. For simplicity, we will henceforth collectively refer to signals for time and frequency synchronization as well as beam identification as just synchronization signals, which comprises synchronization sequences.

In LTE the synchronization signals comprise synchronization sequences i.e. predefined sequences of complex symbols that are repeated in predefined patterns. Each synchronization sequence informs the receiving device about an event, such as a random access window.

If a synchronization signal comprising synchronization sequences is transmitted in a beam sweep, the synchronization sequences will be repeated in each of the beams 1, 2, 3, 4. Typically the beams and thereby the synchronization sequences will be transmitted at different points in time, i.e. the synchronization sequences are time dependent. This type of time shifted synchronization sequences are in this disclosure referred to as "time dependent" and/or "time shifted".

FIG. 1 illustrates that a wireless device 10a will receive the second 2 transmission and the wireless device 10b will receive the fourth 4 transmission of a time dependent synchronization sequence at different points in time. In LTE the time of the random access window is dependent on the time of the synchronization sequence, which implies that the network node needs to listen for random access requests in multiple time slots corresponding to the different beams.

The disclosure proposes to include, in each of the synchronization sequences transmitted from a network node, a timing indication that indicates to the wireless device, or user equipment, UE, 10 when to, for example, listen for additional information and/or send the uplink signal. The timing indication would, according to some aspects, be an integer indicating the number of OFDM symbols until the time when additional downlink transmission and/or uplink signal should occur. For example, if one beam direction is transmitted in each OFDM symbol, the time-indication number would for example in each successive beam be one smaller than in the previous beam, and could therefore be referred to as a countdown indicator or countdown field.

The invention comprises several example embodiments describing details of how the timing indication can be efficiently encoded by signals transmitted in a synchronization sequences. According to some aspects, a method is proposed in which there is a predefined mapping from synchronization sequence index to time indicator, i.e. by detecting which synchronization sequence out of a set of predefined possible synchronization sequences that was transmitted, the receiver can infer a value for the timing indication.

Figure 2:
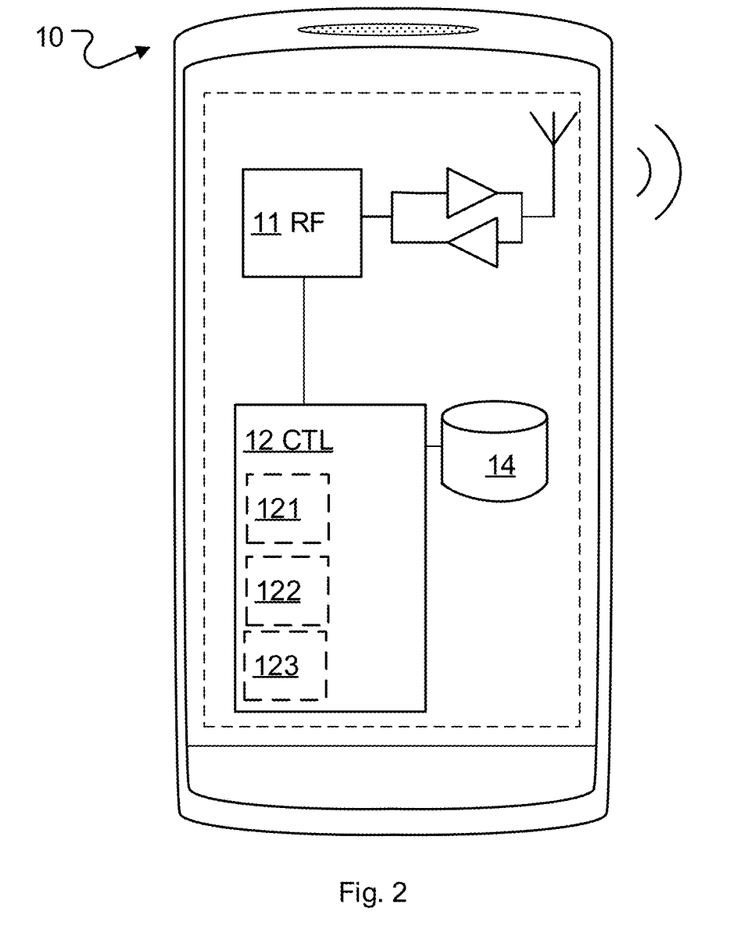
FIG. 2 is an example configuration of a wireless device, according to some of the example embodiments.
Figure 3:
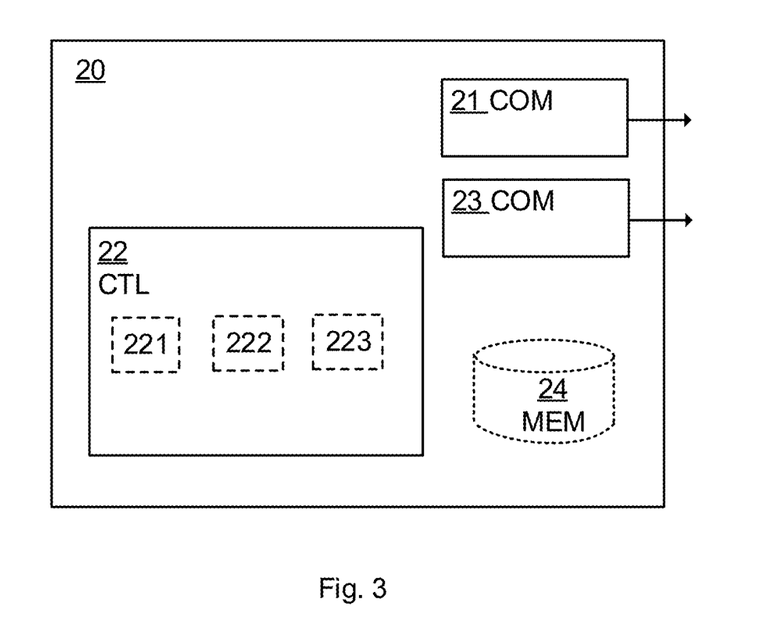
FIG. 3 is an example node configuration of a network node, according to some of the example embodiments.

FIGS. 2 and 3 illustrates examples of a wireless device 10 and a network node 20 which may incorporate some of the example node operation embodiments discussed below. The network node is e.g. an eNodeB. As shown the figures, the wireless device 10 and the network node 20 may comprise a radio communication interface 11, 21 respectively, configured to receive and transmit any form of communications or control signals within a network. It should be appreciated that the radio communication interface 11, 21 may be comprised as any number of transceiving, receiving, and/or transmitting units or circuitry. It should further be appreciated that the radio communication interface 11, 21 may be in the form of any input/output communications port known in the art. The radio communication interface 11, 21 may comprise RF circuitry and baseband processing circuitry (not shown). Furthermore, the network node 20 may comprise a network communication interface 23 configured to exchange any form of communications or control signals with a core network and/or with other network nodes. The network communication is typically referred to as a backhaul.

The wireless device 10 and the network node 20 may further comprise at least one memory unit or circuitry 14, 24 respectively that may be in communication with the radio communication interface 11, 21. The memory 14, 24 may be configured to store received or transmitted data and/or executable program instructions. The memory 14, 24 may also be configured to store any form of beam-forming information, reference signals, and/or feedback data or information. The memory 14, 24 may be any suitable type of computer readable memory and may be of volatile and/or non-volatile type. According to some aspects, the disclosure relates to a computer program comprising computer program code or instruction sets which, when executed in a wireless device, causes the first wireless device to execute any aspect of the example node operations described below. According to some aspects, the disclosure relates to a computer program comprising computer program code or instruction sets which, when executed in a network node, causes the network node to execute any aspect of the example node operations described below.

The wireless device 10 and the network node 20 may further respectively comprise a controller or processing circuitry 12, 22. The processing circuitry 12, 22 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry. The processing circuitry is further adapted to perform all the aspects of the method in a network node described above and below.

Figure 4:
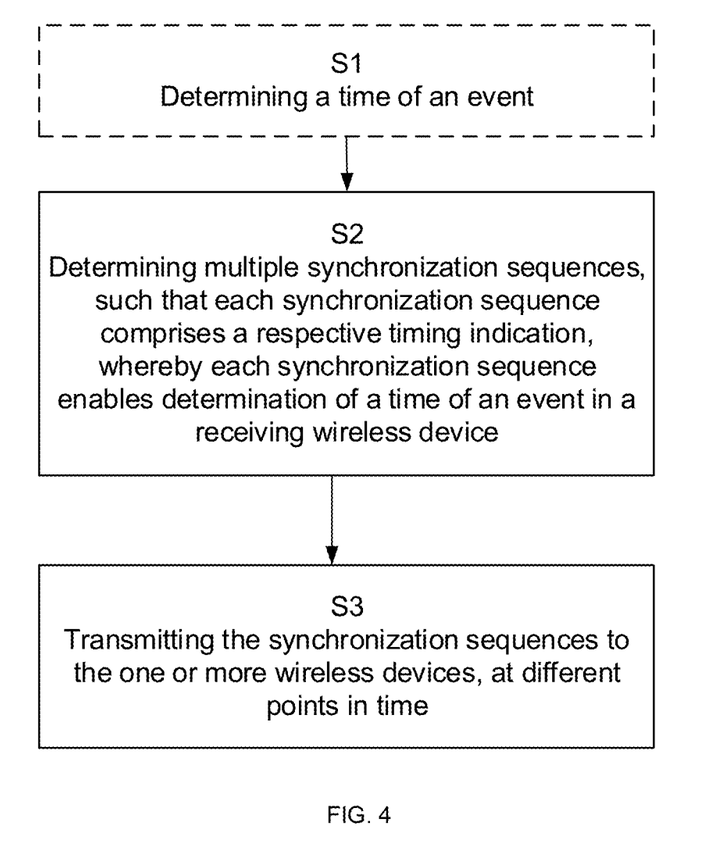
FIG. 4 is a flowchart illustrating embodiments of method steps in a network node.
Figure 5:
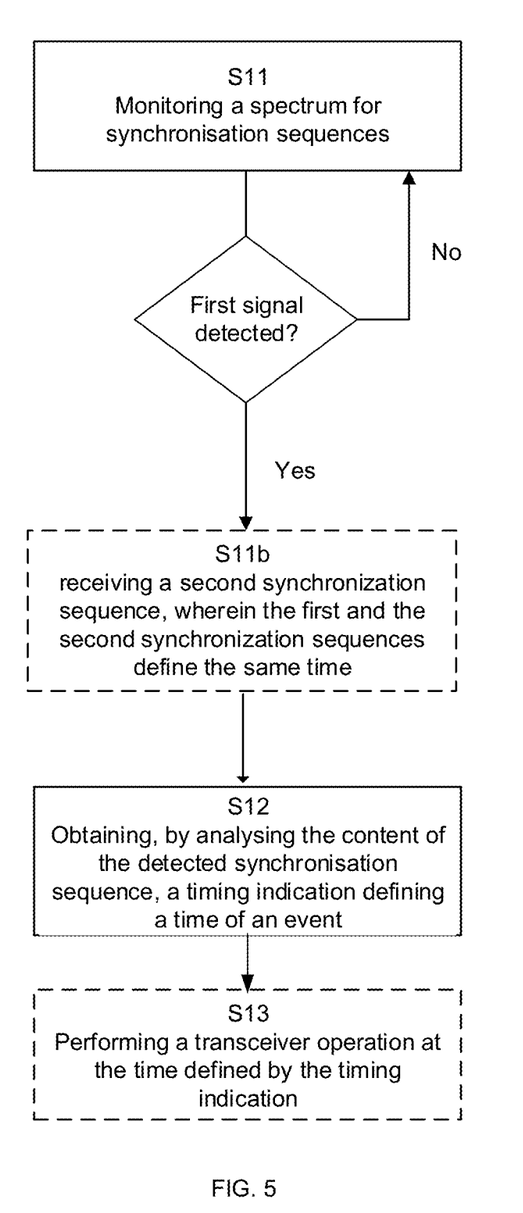
FIG. 5 is a flowchart illustrating embodiments of method steps in a wireless device.

FIGS. 4 and 5 illustrates a concept of the proposed technique implemented in a wireless device 10 in FIG. 2 and in a network node 20 in FIG. 3.

It should be appreciated that FIGS. 4 and 5 comprises some operations which are illustrated with a solid border and some operations which are illustrated with a dashed border. The operations which are comprised in a solid border are operations which are comprised in the broader example embodiment. The operations which are comprised in a dashed border are example embodiments which may be comprised in, or a part of, or are further operations which may be taken in addition to the operations of the solid border example embodiments. It should be appreciated that the operations need not be performed in order. Furthermore, it should be appreciated that not all of the operations need to be performed. The example operations may be performed in any suitable order and in any combination.

The disclosure provides for a method for use in a network node, for transmitting synchronization sequences of a synchronization signal to one or more receiving wireless devices, see FIG. 4. The method comprises determining S2 multiple synchronization sequences, such that each synchronization sequence comprises a respective timing indication. In other words, a synchronization sequences are not only repeated at the different points in time, instead the time dependent versions of the synchronization signal are selected or determined such that they are different. Thus, additional information is included in the time dependent versions, which defines the actual time of the event. Hence, all of the time dependent versions of the synchronization signal now refer to the same point in time, i.e. the time of an event such as a random access window. This implies that the synchronization sequences are in some sense similar, or the same, as they refer to the same event. However, the actual sequence of complex numbers that is transmitted may be different, which will be further described below. Hence, when using the proposed technique, each synchronization sequence enables determination of a time of an event in a receiving wireless device. According to some aspects the synchronization sequences is a code word, e.g. using a Reed-Muller code.

The method further comprises transmitting S3 the synchronization sequences to the one or more wireless devices, at different points in time. The synchronization sequences, which are parts of the synchronization signal, are transmitted at different points in time to one or several wireless devices. In other words, the synchronization sequences that are referring to the same event are retransmitted at different points in time. The processing circuitry 22 of the network node is configured to determine S2 the multiple synchronization sequences and to transmit S3, via the communication interface 21, the synchronization sequence to one or more wireless device. According to some aspects, the processing circuitry comprises a determiner 222 for determining the synchronization sequence and a transmitter 223 for transmitting the synchronization sequence.

According to some aspects, the multiple synchronization sequences are time dependent versions of a synchronization signal referring to one particular event. By providing time dependent synchronization sequences, the fact that the beam sweep transmits signals at different times can be compensated for. By providing a timing indication in each synchronization sequence, the wireless device is informed of the time of an event so that it can react accordingly. In a system using beam sweeps, the timing indication provides a way for the wireless device to synchronize to the network node. The event is for example when the network node listens for a system access request from the wireless device. In that particular case, the wireless device uses the timing indication to determine when to send the system access request. The wireless device does not then have to transmit its UL signal at multiple time instances. It also does not need to listen for any additional information necessary to access the system, e.g. system information, at multiple time instances and/or the network does not have to transmit additional information at multiple time instances. The timing indication is described below with examples.

The time of the event may not always be predetermined. So, according to some aspects, the method further comprises determining S1 a time of the event. The processing circuitry 22 of the network node is configured to determine S1 the time. According to some aspects, the processing circuitry comprises a determiner 221 for determining the time. The time is used when providing the timing indication in the multiple synchronization sequences. To determine the time of the event comprises for example to determine a duration of time between the transmission of a synchronization sequence and the event. Another example is to determine an absolute time of an event as given by a reference clock. Examples will be further discussed below.

As can be seen in FIG. 1, the synchronization sequences are, according to some aspects, transmitted in different directions. Thus, wireless devices located at different directions from the network node receives synchronization sequences which have been transmitted in different directions, for example 2 and 4 of FIG. 1. The wireless devices can then use the timing indication to synchronize the event with the network node. Different directions here means in different spatial directions from the network node as can be seen in the FIG. 1. Transmitting in different directions is for example accomplished by so called beam forming using co located antennas, also called antenna arrays. According to some aspects, the transmission of the synchronization sequences constitutes a beam sweep. I.e. the synchronization sequences are transmitted in several directions, at consecutive points in time, from the network node. The network thus uses high-gain narrow beamforming, which will enable high-data-rate transmission coverage also to very distant users which would not realistically be covered with normal sector-wide beams, which have lower antenna gain.

When transmitting in different directions or at different times, the timing indications need to be well defined. According to some aspects, the timing indications are relative to a time of transmission of the respective synchronization sequence. In other words, the timing indication depends on the time of transmission. According to some aspects, the timing indication comprises a time length from the time of transmission. When the timing indication is relative to the time of transmission it is easy for the wireless device to determine when the time of the event is. According to some aspects, the timing indications are relative to a reference clock; for example a reference clock in the network node. When using a reference clock, it is possible to give a precise timing indication by referring to the reference clock. The reference clock is a clock that both the wireless device and the network node has access to. According to some aspects, the timing indication is indication of the current time with respect to the frame structure, e.g. the number of OFDM symbols since the start of the current super-frame, from which the wireless device can derive the time until the time intended for additional information and/or uplink signal.

According to some aspects, the timing indication is a pseudo-random number which is used once and discarded until all the sequences in the current signal are handled. The wireless device would beforehand have been provided with a translation method for converting the pseudo-random numbers into time indications as needed. One possible implementation of the embodiment is to use a sequence of predetermined states of a linear feedback shift register with a known starting state.

There are several examples of events when the present disclosure is useful. According to some aspects, the event is a time of a reserved time slot where the wireless device is allowed to transmit. I.e. the event is a time when the network node listens for an uplink, UL, signal from the wireless device. Thus, the wireless device is informed of when it is possible to transmit to the network node. According to some aspects, the reserved time slot is a random access, RA, window. Hence, the wireless device is informed of when to send random access message. The event for example defines the beginning of the RA window or the beginning of another action. According to some aspects the time is a start time of a reserved time slot which may be useful in, for example, the case that the event is a rather long time window, whose length is variable but has been communicated by other means.

According to some aspects, different timing indications are transmitted in different synchronization sequences in order to reduce congestion on the uplink. These different timing indictors, and their corresponding synchronizations, are typically transmitted in different directions from the network node. Hence, the timing indications may refer to different points in time, which enables use of several RA windows. In this way, wireless devices which are located in different directions from the network nodes, will use different RA windows. This approach is useful if many wireless devices are included in the coverage of a network node, i.e. many devices can receive the synchronization signals. With many devices detecting synchronization signals follows that also many devices will transmit a random access signal. The risk of too many simultaneous RA transmissions, such that the network node cannot receive all of them correctly, is reduced with a directional separation of devices into at least two groups transmitting in different RA windows. This is an adaptation possibility to control the Random Access, RA, resource reservation vs. congestion trade-off.

According to some aspects, the time slots for additional information and/or uplink signal are not periodically occurring, but rather dynamically decided by the network based on traffic demands and/or behavior of other wireless devices.

Figure 6:
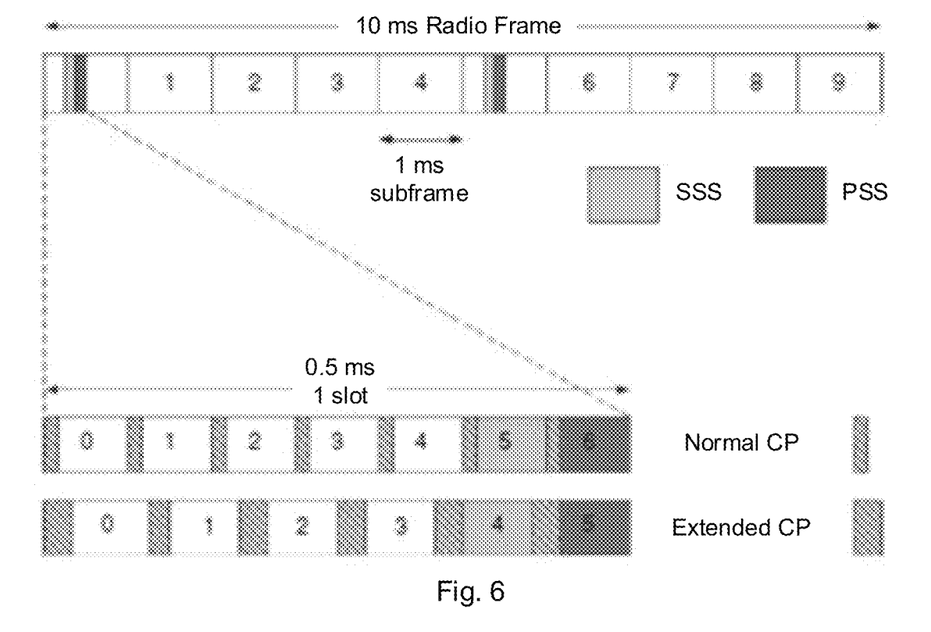
FIG. 6 shows PSS and SSS frame and slot structure in time domain in the FDD case.

In LTE the network sends Primary and Secondary Synchronisation Sequences, PSS/SSS, in an a priori known frequency allocation (6 central resource blocks of the downlink frequency band) in potentially known time domain slots both from an OFDM symbol and subframes point of views. In other words, the UE knows that PSS/SSS come respectively in OFDM symbols #6 and #5 (for normal CP) being repeated in subframe #0 and subframe #5. After detecting both the PSS and the SSS the UE is DL synchronized both from an OFDM symbol and subframe perspectives. This is shown in FIG. 6.

In addition to the synchronization the UE detects the physical cell identity, PCI, that is encoded in the PSS/SS. Based on that the UE is capable of using the cell-specific reference signals, CRS, in order to estimate the channel and decode the system information which contains the most basic information the UE should be aware of before it attempts to access the system. This information is organized in what we call master information blocks, MIB, and system information blocks, SIBs.

Figure 8:
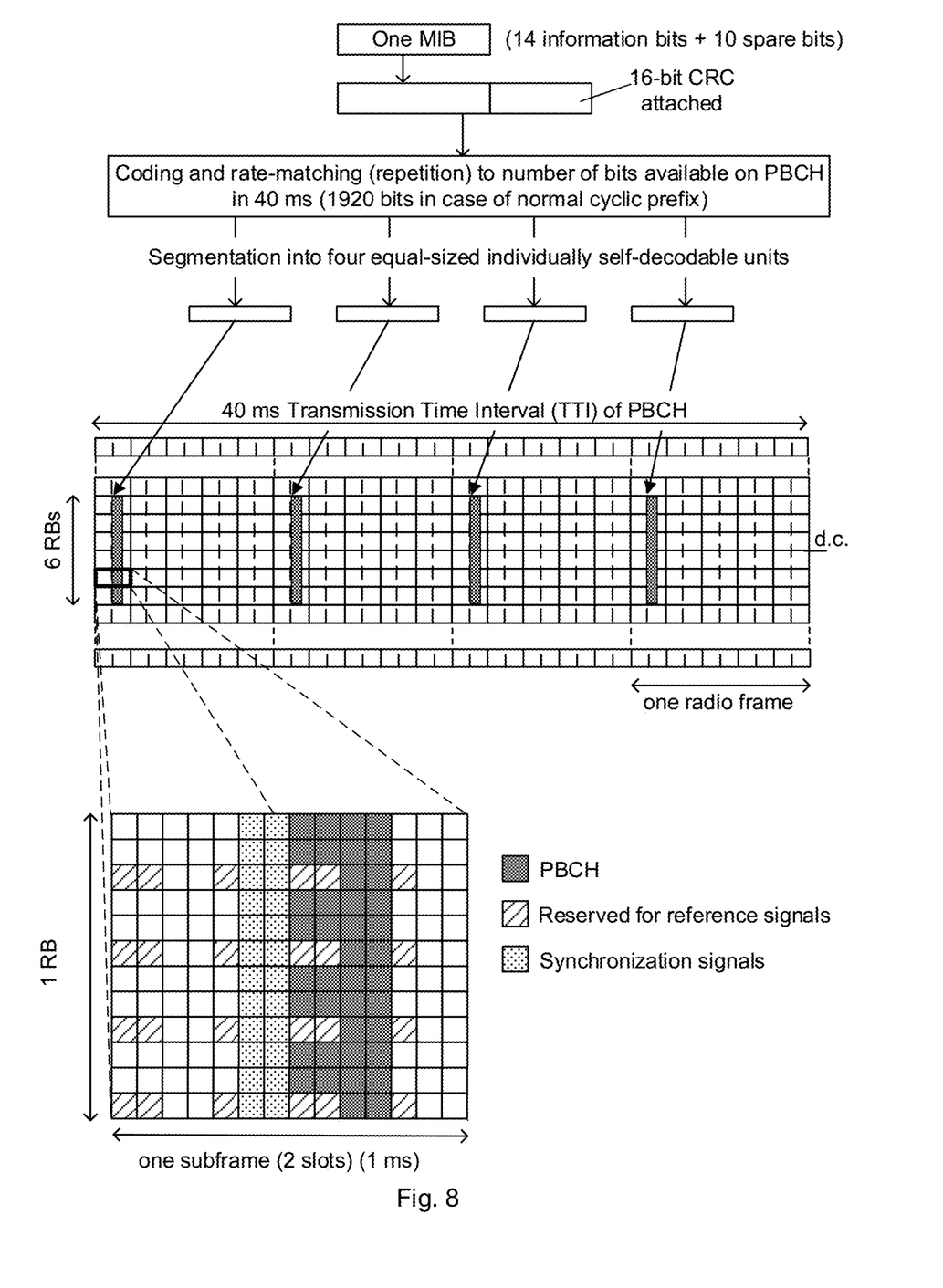
FIG. 8 shows the PBCH structure in LTE. The drawing at the bottom is an enlargement of one subframe, marked with a thick square in the figure.

The physical channel which this information is transmitted on differs from block to block. For example, the master information blocks, MIB, are transmitted over the Physical Broadcast Channel, PBCH, while the other SIBs are transmitted over the Physical Downlink Shared Channel, PDSCH, so they can be flexibly scheduled in other portions of the frequency band. The PBCH structure in LTE is illustrated in FIG. 8.

In order to access the system the UE needs to start a random access procedure. This is triggered by sending a random access preamble over the physical random access channel, PRACH. The PRACH can be multiplexed over the uplink band with the physical uplink control channel, PUCCH, also used for channel status reports, acknowledgements and/or scheduling requests.

Before the UE can transmit the random access preamble it has to acquire information about the how PRACH is multiplexed in the UL band. This is informed in SIB2 in the IE prach-Configuration Index which goes from 0 to 63 and contains among other things the following parameters (details can be found in TS 36.211 version 11.2.0): Preamble format, Subframe Sequence number and Subframe number.

Figure 7:
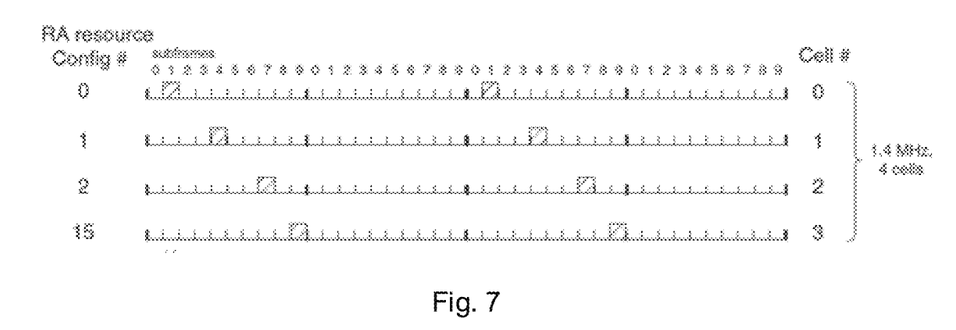
FIG. 7 shows an example of PRACH configurations informed via SIB2.

The configuration index basically indicates in which time-domain resource(s) in PUCCH the UE should send a random access preamble (i.e. on the PRACH). FIG. 7 shows some examples of configurations for a given preamble format. Details can be found in TS 36.211 (chapter 5.7.1), version 11.2.0.

In summary, in LTE the UE needs to decode the whole payload from SIB2 (after getting DL synchronized and being capable of performing channel estimation) in order to get the necessary information to send a system access request. This relies on the fact that information is sent in all directions in well-defined time-domain structures (OFDM symbols, subframes, radio frame, etc.)

Another example is when the event is a time of a further transmission from the network node. In other words, the event is a time that the wireless device is to listen for another transmission from the network node. This enables the wireless device to be more efficient since it does not have to listen for transmission on other times than the time defined in the synchronization sequence.

According to some aspects, the mapping from synchronization signal index to time is informed via the system information which could be obtained via another method such as the one in LTE or via the system control plane, SCP, access concept. In the case of LTE, the SIB2 message could contain a mapping between synchronization sequence to be beamformed and the time-frequency allocation where the UL request signal should be transmitted and/or where additional information would be expected. In the case of the SCP access concept, this mapping could be informed via the access information table, AIT, and later pointed to by a system signature sequence, SSI. An UL system request signal in this context could be e.g. a PRACH preamble, a request for further system information to be transmitted or an UL synchronization message without major higher layer meaning.

In one embodiment, the "system information" can contain information about the system bandwidth and/or other information similar to the information contained in the system information in LTE, in particular the contents of the MIB, SIB1 and SIB2, such as system frame number and barring information.

There are several possible ways to provide the timing indication. According to some aspects, the timing indications are encoded into the synchronization sequence. In other words, the timing indication is implicitly encoded. The system would then, for example, have multiple different synchronization sequences predefined, and each synchronization sequence would have an index associated with it. The synchronization sequences themselves may have arbitrary construction; normally, the sequences may be optimized to have good auto- and cross-correlation properties and/or good Euclidean or Hamming distance properties. Each such index would then correspond to a timing indication according to a predefined mapping, which will be referred to as a countdown index mapping. In general, multiple sequence indices/synchronization sequences may correspond to the same timing indication.

This is particularly useful in a variant of the proposed technique where multiple beams are transmitted at the same time, from a single network node or from multiple network nodes, since one may then want the wireless device to be able to distinguish between the different beams (for example for later reporting to the network), while still receiving the same (or different) timing indication. It will be readily apparent, that the synchronization sequence thus defined would be equivalent to an encoding of the index. One example of this variant is an access node that transmits two beams (called a and b) simultaneous in different directions. However, for some reason, it only wants to listen in one direction at the time. Hence, the access node wants to make sure that UEs in different directions respond at different points in time.

Hence according to a variant, of this disclosure proposes a method for use in a network node, for transmitting synchronization sequences of a synchronization signal to one or more receiving wireless devices. The method comprises determining multiple synchronization sequences, such that each synchronization sequence comprises a respective timing indication, whereby each synchronization sequence enables determination of a respective (or the same) time of an event in a receiving wireless device; and transmitting the synchronization sequences to the one or more wireless devices, at least partly at the same point in time but in different directions.

Another example of this variant is an access node may transmit one beam in direction a and another in direction b. However, a UE can for some reason only transmit in one direction at the time, which is known by the access node. Then the access node wants to make sure that the UE can respond in one direction at the time.

Now turning back to FIG. 4. According to some aspects of the method, each one of the synchronization sequences are determined to comprise a synchronization sequence from a set of dissimilar synchronization sequences, and wherein each of the dissimilar synchronization sequences in the set is mapped to a respective point in time or to a timing. E.g. wherein the timing indication corresponds to a synchronization signal index from which the receiving wireless device can infer a value for the timing indication. When different synchronization sequences are transmitted in different directions and when they are dissimilar, i.e. distinct, the receiving wireless device can infer a value for the timing indication. In other words, the timing indication is implicit in the distinct synchronization sequences. Another example is that each synchronization sequence is mapped to a time or timing by an index. Please note that multiple different sequence indices can be mapped to the same timing indication. It is then possible to determine the time or timing by looking up the index in for example a table.

According to some aspects, in the case of implicit encoding, the multiple different synchronization sequences may correspond to different frequency shifted version of the same basic synchronization sequence, e.g. by transmitting the same synchronization sequence over different subcarriers in different time slots. The frequency at which the sequence is transmitted can be mapped into a timing indicator.

According to some aspects, the uplink signal can be sent on a physical random-access channel, PRACH, wherein the uplink signal could e.g. be a random access preamble, or an uplink synchronization channel, USS, wherein the uplink signal could e.g. be an uplink synchronization sequence/signal.

EXAMPLE EMBODIMENTS

In one example embodiment of the disclosure, the downlink synchronization signals (sequences) are indexed, such that the indices form a consecutive number series. This could be described in the system information or possibly even standardized. When putting together a set of downlink synchronization signals for the above non-pre-configured scenarios, the access node would choose a set of downlink synchronization signals whose indices would form a consecutive number series. The downlink synchronization signals would be transmitted in an order such that the corresponding indices would form a consecutive decreasing number series. At the point in time where the uplink signal, e.g. a system access request such as a random access request, is to be transmitted, the number series of the indices, as indicated by the potential transmission of a downlink synchronization signal, should have reached a number where a certain number of the least significant bits are zero. We may refer to this downlink synchronization signal as the end-of-set downlink synchronization signal and its index the end-of-set index. The term "potential transmission" is here used for the end-of-set downlink synchronization signal, simply because it is not certain that it is transmitted. If the access node wants the set of synchronization beam transmissions to end a longer time before the uplink signal, then the decreasing consecutive series of indices will be interrupted before it reaches the end-of-set index.

Figure 9:
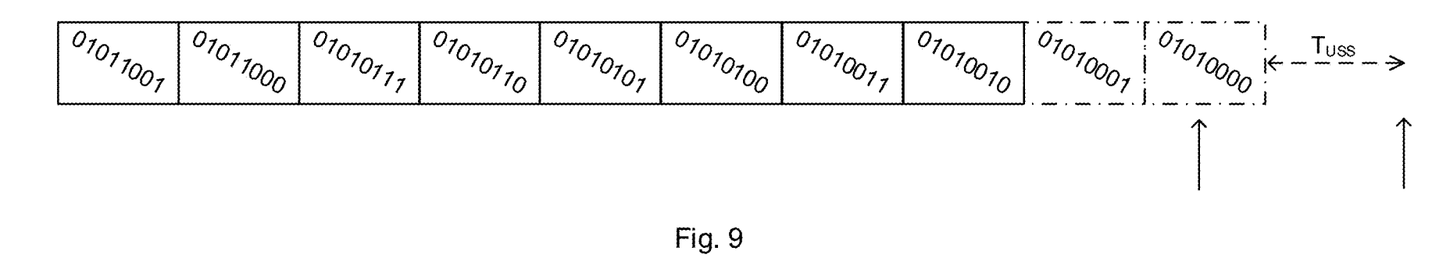
FIG. 9 shows an example of a downlink synchronization signal, in the form of a set of synchronization sequences, with countdown indicator (countdown field).

With this principle, each downlink synchronization sequence would, via its index, indicate to the wireless device exactly the time distance from the downlink synchronization sequence transmission until the uplink signal transmission, i.e. it would serve the purpose of a countdown indicator. For instance, if the format of an end-of-set index is defined as an index ending with 0000, a set of downlink synchronization sequences could consist of 8 downlink synchronization sequences with the binary index series (assuming 8 bit indices) 01010111, 01010110, 01010101, 01010100, 01010011, 01010010, 01010001, 01010000 (i.e. decimal 87, 86, 85, 84, 83, 82, 81, 80), see last 8 indices of FIG. 9. In another example where the end-of-set downlink synchronization sequences is not transmitted, because a longer time to the uplink signal is desired, there could be downlink synchronization sequences with indices 01011001, 01011000, 01010111, 01010110, 01010101, 01010100, 01010011, 01010010 (i.e. decimal 89, 88, 87, 86, 85, 84, 83, 82). The latter example is illustrated by FIG. 9, showing the point in time for the uplink signal defined to occur, denoted TUSS (where USS denotes the uplink signal), after the (hypothetical/potential) transmission of the end of set downlink synchronization sequences. An example of an UL signal could be an uplink synchronization signal (USS), a system access request, or something else. In FIG. 9 each box pictures a Mobility Reference Signal, MRS, with a specific index, where the MRS here denotes the downlink synchronization sequence, and the Uplink Synchronization Channel, USS, the uplink signal. The left vertical arrow indicates the hypothetical transmission of end-of-set MRS, whereas the right vertical arrow indicates the point in time for the uplink signal defined to occur TUSS.

Figure 10:
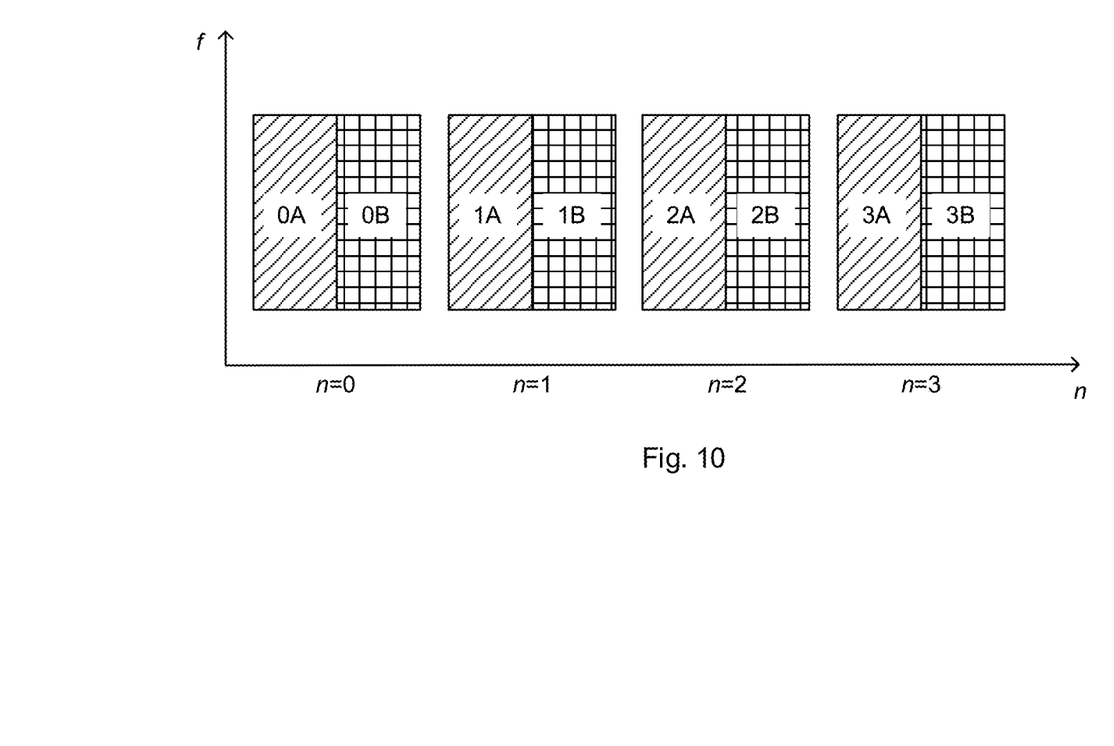
FIG. 10 is an illustration of a synchronization signal.

In another embodiment, according to some aspects, each transmitted beam consists of at least two parts, one part that serves as training (pilot/reference/synchronization) sequence, e.g. a predefined sequence e.g. of QPSK-modulated symbols or a Zadoff-Chu sequence, allowing the wireless device to synchronize, detect the beam, and perform channel estimation, and one part that contains the timing indication encoded using some channel code, e.g. a Reed-Muller code. The two parts can be separated for example by using different, but typically adjacent, time and/or frequency resources. FIG. 10 is an example illustration of a synchronization signal where each OFDM symbol consists of two parts separated in time, nA and nB, where n is the OFDM symbol number. The horizontal axis represents the OFDM symbol number and the vertical axis represents the frequency.

As already mentioned, the timing indication can be implicitly encoded in the synchronization sequence. A variant of this approach could be to let each transmitted beam consist of two or more parts, separated in time and/or frequency, where both parts consist of some kind of synchronization sequence, but where the two synchronization sequences are not the same.

For example, the synchronization sequence in one part may be the same for many beam directions and/or time instances, whereas the sequence in the other part may be different for different beam directions and/or time instances. Such an arrangement may be useful to reduce the computational complexity in the wireless device: For the first part, only a few possible synchronization sequences may be needed in the system, reducing the search space and hence computational complexity in the wireless device, whereas for the second part, a larger number of synchronization sequences may be used in the system while still keeping the complexity of the wireless device moderate, since the wireless device already has a rather good channel estimate from the first part.

According to some aspects, certain beam directions are repeated two or more times, e.g. to allow the receiver to perform receive beam scanning, but with different countdown indicator values.

According to some aspects, the disclosure also relates to a computer program comprising computer program code which, when executed in a programmable controller of a network node, causes the network node to execute the methods described above and below. In other words, the disclosure also relates to a computer readable storage medium, having stored there on a computer program which, when executed in a programmable controller of a network node, causes the network node to execute the methods described above and below.

The disclosure provides a corresponding method in the wireless device, which will now be described referring to FIG. 5. The disclosure provides a method for use in a wireless device 10, for receiving one or more synchronization sequences of a synchronization signal. The method comprises monitoring S11 a spectrum for synchronisation sequences. Monitoring a spectrum here means receiving a radio signal and based on the received signal, and possibly additional assumptions about e.g. noise and interference levels, estimating for one or more predefined synchronization sequences a quality measure, e.g. the likelihood that it has been transmitted. Such a quality measure can typically be based on a matched-filter approach where the received signal is correlated with each one of the one or more predefined synchronization sequences, e.g. random access preambles. Typically the monitoring goes on until a match is found, i.e. until the correlation is above a certain threshold.

When a first synchronisation sequence is detected then the method comprises obtaining S12, by analysing the content of the detected first synchronisation sequence, a timing indication defining a time of an event. In the description of the network node many examples are given regarding how the timing indication can be included.

The processing circuitry 12 of the wireless device is configured to monitor S11, via the communication circuitry 11, the spectrum and to obtain S12 the timing indication. According to some aspects, the processing circuitry comprises a monitoring unit 121 for monitoring and an obtainer 122 for obtaining the timing indication. The timing indication has been included in the synchronization sequence by a transmitting network node.

Accordingly, the wireless device is informed of the time of an event so that it can react accordingly. As previously discussed, this for example enables that the wireless device does not then have to transmit its uplink, UL, signal at multiple time instances. It also, for example, does not need to listen for any additional information necessary to access the system, e.g. system information, at multiple time instances and/or the network does not have to transmit additional information at multiple time instances.

According to some aspects, in system implementations where the network node provides the wireless device with a list of beam identifiers or sequence indices to monitor, the provided index for a given beam may contain (1) the initial part of the full index sequence, and (2) the number of countdown hypotheses, i.e. timer values. The wireless device may then add the timer bits to the initial part of the sequence to form a full sequence and fetch the corresponding reference sequence, which will then be searched for in the received signal.

As previously discussed, the multiple synchronization sequences are, according to some aspects, time dependent versions of a synchronization signal referring to one particular event. Analyzing the content of the detected first synchronization sequence comprises for example to decode the first synchronization sequence and searching for a timing indication.

Depending on the location of the wireless device 10, the wireless device may receive more than one synchronization sequence. According to some aspects, the method comprises receiving S11b a second synchronization sequence, wherein the first and the second synchronization sequences define the same time. In the example when the timing indication is a relative time from the time of transmission, the relative time is different in the synchronization sequences but the time the indications define is the same time. According to some aspects, it is enough that the wireless device receives one synchronization signal, but there might be the case that it needs several for sufficient reliability. According to some aspects the network node has communicated beforehand to the wireless device how the device should handle such a situation. An example is that the network node has communicated to the wireless device that it will repeat the synchronization sequence N number of times, in each beam direction, with the same sequence every time except for a countdown field that is reduced with 1 for each repetition to indicate which of the repetitions it is. According to some aspects, the timing indications are relative times to a time of a transmission of the respective synchronization sequence. When the timing indication is relative to the time of transmission it is easy for the wireless device to determine when the time of the event is. The synchronization sequences may thus comprise different timing indications but define the same time. This is useful for example if the event is an event which occurs at the same time for all wireless devices in all directions from the network node. As also discussed when discussing the method of the network node, the timing indications are, according to some aspects, relative to a reference clock or the event is a time of a reserved time slot where the wireless device is allowed to transmit. According to some aspects, the reserved time slot is a random access window. The specifics of these examples have been previously discussed.

According to some aspects, the method comprises performing S13 a transceiver operation at the time defined by the timing indication. In other words, the wireless device receives and/or transmits at a time defined in the synchronization sequence.

The processing circuitry 12 is configured to perform S13 the multiple synchronization sequences. According to some aspects, the processing circuitry comprises a determiner 123 for determining. The transceiver operation is for example to transmit a random access preamble in an indicated RACH slot. According to some aspects, the event is a time when the wireless device is requested to listen for further transmission from the network node. Thus, the wireless device does not need to listen for any additional information at multiple time instances.

As also previously discussed when discussing the method of the network node, the timing indications are, according to some aspects, encoded into the synchronization sequences and wherein the analyzing comprises decoding the synchronization sequence. If the timing indication is encoded in the synchronization sequence, then the wireless device may need to decode the synchronization sequence in order to detect the time of the event.

According to some aspects, the wireless device monitors the spectrum for several dissimilar synchronization sequences, and wherein each of the dissimilar synchronization sequences is mapped to a respective point in time or to a timing. Since the wireless device does not initially know in which direction from the network node it is located, and thus which synchronization sequence transmission it may receive, it monitors a spectrum of several possible transmissions. The distinct synchronization sequences each provide a point in time or a timing of the event. If there are different synchronization sequences being mapped to different events, then the mere detection of the particular sequence (or preamble) tells the wireless device where to e.g. send its random access request.

As previously discussed, this time or timing is either relative to something else or absolute. According to some aspects, each synchronization sequence is mapped to a time or timing by an index and wherein the obtaining 12 comprises retrieving a time of timing using the index. Note that multiple different sequence indices may be mapped to the same timing indication. It is then possible to determine the time or timing by looking up the index in for example a table. Thus, the time or timing defines a time of the event.

According to some aspects, the disclosure also relates to a computer program comprising computer program code which, when executed in a programmable controller of a wireless device, causes the wireless device to execute the methods described above and below. In other words, the disclosure also relates to a computer readable storage medium, having stored there on a computer program which, when executed in a programmable controller of a wireless device, causes the wireless device to execute the methods described above and below.

The description above consistently considers a wireless device that should synchronize to a network of network nodes, but the same techniques can be used in other synchronization and/or beam finding situations, for example a newly deployed network node that needs to synchronize to another pre-existing network nodes (or even wireless device) in the network, especially in networks using self-backhauling. The description also applies to device-2-device, D2D, initial synchronization. Hence, the techniques described above may in many cases apply equally well when "uplink" is replaced by "downlink" and vice versa. Furthermore the description above focuses on initial access, but similar techniques can be used to synchronize and/or find beams in, e.g., handover situations.

The disclosure above primarily considers joint synchronization and beam finding, but the techniques are applicable also in situations where only beam finding is needed, for example because synchronization has already been achieved before by other means.

The disclosure above often mentions OFDM as an example. However, the techniques described here are applicable also to several variants of OFDM as well as to many other multiplexing schemes, including e.g. DFT-spread OFDM, filtered OFDM, filter-bank multicarrier (FBMC), single-carrier frequency-division multiple access (SC-FDMA), etc. The techniques are also applicable to other types of RATs, TDMA, CDMA etc.

The value of the detected countdown indicator may also somehow be embedded in an uplink response (e.g. system access request) from the UE. This may be useful to help the network determine which beam the UE heard.

The disclosure results in a significant reduction in resource allocation overhead. There is a reduction in needed uplink resources compared to having a fixed time between downlink synchronization signal and uplink signal. A reduction in downlink signaling is achieved as compared to transmitting a detailed system configuration (system information) in all downlink beams. A timing indication included in the synchronization sequences is a highly flexible way of indicating the proper timing for the uplink signal. The system can with this approach configure how often the uplink signals, e.g. in the form of a packet random access using e.g. a PRACH, are allowed. This method is in contrast to having a fixed (or semi-static) configuration of time intervals for uplink access (PRACH). The network node can select if several beams and wireless devices, or UEs, are given the same timing indication, in order to save uplink resources, or if the different beams and UEs should be configured to separate uplink time intervals, in order to reduce congestion.

The advantages may be particularly pronounced in systems where analog beamforming is employed in the Network node and/or in the wireless device. There are several reasons for this, and here is provided just one example: An analog beam former would typically use digitally controlled phase shifters to define the beam configuration, and the shape of the resultant pattern would depend on the particular phasing chosen for the antenna elements or antenna ports. Thus a beam pattern with multiple main lobes can be labelled with the same timing indication for several directions, making the uplink signals from various directions coincide with the same value of the timing indication. This uplink signal may occur from random access signals from one or more wireless device in any advantaged position.

Within the context of this disclosure, the terms "wireless terminal" or "wireless device" encompass any terminal which is able to communicate wirelessly with another device, as well as, optionally, with an access node of a wireless network) by transmitting and/or receiving wireless signals. Thus, the term "wireless terminal" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless nodes. Hence, whenever a "user equipment" or "UE" is referred to in this disclosure, this should be understood as encompassing any wireless terminal as defined above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method implemented by a network node of a wireless communication network, the method comprising:
    transmitting respective synchronization sequences in respective beams transmitted in a beam sweep by the network node at different transmission times, the synchronization sequences for use by wireless devices in gaining time and frequency synchronization with the wireless communication network; and
    wherein each synchronization sequence has an index that depends on the transmission timing of the synchronization sequence and indicates a relative timing of a forthcoming uplink transmission occasion for the wireless devices.

2. The method of claim 1, wherein each synchronization sequence is beam-specific.

3. The method of claim 1, wherein transmitting the respective synchronization sequences is performed during the beam sweep in which the network node transmits the respective synchronization sequences at successive transmission times, and wherein the index of each synchronization sequence depends on the transmission time within the beam sweep.

4. The method of claim 1, wherein two or more of the respective beams are transmitted in different directions at different times.

5. The method of claim 1, wherein the relative timing is a time remaining until the uplink transmission occasion.

6. The method of claim 1, wherein the forthcoming uplink transmission occasion is a reserved time slot where the wireless devices are allowed to transmit.

7. The method of claim 6, wherein the forthcoming uplink transmission occasion is a random access window.

8. The method of claim 1, wherein each synchronization sequence is comprised in a transmission that encodes the index of the synchronization sequence.

9. The method of claim 1, wherein each synchronization sequence is comprised in a synchronization transmission that includes transmission of a Physical Broadcast Channel (PBCH), and wherein the method comprises performing a plurality of synchronization transmissions sequentially during the beam sweep, where the index of each synchronization sequence indicates the position of the synchronization transmission within the plurality of synchronization transmissions.

10. A method of operation by a wireless device with respect to a wireless communication network, the method comprising:
    receiving a synchronization sequence transmitted in a beam sweep by a network node of the wireless communication network, the synchronization sequence to be used for obtaining time and frequency synchronization with the wireless communication network and being one among two or more synchronization sequences transmitted by the network node at different transmission times;
    determining an index of the synchronization sequence, the index being dependent on the transmission timing of the synchronization sequence;
    determining a time of a forthcoming uplink transmission occasion according to a relative timing indicated by the index.

11. The method of claim 10, wherein the relative timing is a timing offset in which a time remaining until occurrence of the forthcoming uplink transmission occasion is indicated by the index.

12. The method of claim 10, wherein the forthcoming uplink transmission occasion is a random access window.

13. A wireless device configured for operation in a wireless communication network, the wireless device comprising:
    a communication interface configured to receive transmissions from a network node of the wireless communication network; and
    processing circuitry configured to:
        determine an index of a synchronization sequence transmitted by the network node as one among two or more synchronization sequences transmitted at different times, the index indicating a relative timing; and
        determine a time of an upcoming random access window from the relative timing indicated by the index.

14. The wireless device of claim 13, wherein the two or more synchronization sequences are among a plurality of synchronization sequences transmitted sequentially by the network node during the beam sweep.

* * * * *

UNITED STATES PATENT AND TRADEMARK OFFICE
CERTIFICATE OF CORRECTION

| | |
|---|---|
| PATENT NO. | : 11,818,674 B2 |
| APPLICATION NO. | : 17/569185 |
| DATED | : November 14, 2023 |
| INVENTOR(S) | : Axnäs et al. |

It is certified that error appears in the above-identified patent and that said Letters Patent is hereby corrected as shown below:

On the Title Page

On Page 2, item (56), under "OTHER PUBLICATIONS", in Column 2, Line 2, delete "U.S. Appl." and insert -- U.S. Provisional Appl. --, therefor.

In the Specification

In Column 1, Lines 27-28, delete "Evolved Universal Terrestrial Access Network, E-UTRAN." and insert -- Evolved Universal Terrestrial Radio Access Network, (E-UTRAN). --, therefor.

In Column 1, Line 60, delete "synchronizations" and insert -- synchronization --, therefor.

In Column 2, Line 28, delete "also to" and insert -- to --, therefor.

In Column 2, Line 62, delete "a certain" and insert -- at a certain --, therefor.

In Column 6, Line 51, delete "figure." and insert -- figure; --, therefor.

In Column 6, Line 54, delete "field)." and insert -- field); --, therefor.

In Column 7, Line 24, delete "synchronization;" and insert -- synchronization --, therefor.

In Column 7, Line 29, delete "that was" and insert -- was --, therefor.

In Column 8, Line 14, delete "that was" and insert -- was --, therefor.

In Column 8, Line 17, delete "illustrates" and insert -- illustrate --, therefor.

In Column 8, Line 20, delete "shown the" and insert -- shown in the --, therefor.

Signed and Sealed this
Seventeenth Day of September, 2024

Katherine Kelly Vidal
*Director of the United States Patent and Trademark Office*

CERTIFICATE OF CORRECTION (continued)
U.S. Pat. No. 11,818,674 B2

In Column 8, Line 26, delete "comprised as" and insert -- comprised of --, therefor.

In Column 9, Line 4, delete "illustrates" and insert -- illustrate --, therefor.

In Column 9, Line 7, delete "comprises" and insert -- comprise --, therefor.

In Column 9, Lines 54-55, delete "communication interface 21," and insert -- radio communication interface 21, --, therefor.

In Column 10, Line 46, delete "also to" and insert -- to --, therefor.

In Column 11, Line 16, delete "transmit. I.e." and insert -- transmit, i.e. --, therefor.

In Column 11, Line 32, delete "indictors," and insert -- indicators, --, therefor.

In Column 11, Lines 53-54, delete "Primary and Secondary Synchronisation Sequences, PSS/SSS," and insert -- Primary and Secondary Synchronisation Signal, PSS/SSS, Sequences, --, therefor.

In Column 11, Line 54, delete "an a" and insert -- a --, therefor.

In Column 12, Line 4, delete "MIB," and insert -- MIBs, --, therefor.

In Column 12, Line 6, delete "which" and insert -- on which --, therefor.

In Column 12, Line 7, delete "on differs" and insert -- differs --, therefor.

In Column 12, Line 8, delete "MIB," and insert -- MIBs, --, therefor.

In Column 12, Line 23, delete "the how" and insert -- how the --, therefor.

In Column 12, Line 25, delete "prach-Configuration" and insert -- PRACH-Configuration --, therefor.

In Column 12, Line 41, delete "etc.)" and insert -- etc.). --, therefor.

In Column 12, Line 47, delete "on other" and insert -- at other --, therefor.

In Column 12, Line 60, delete "SSI." and insert -- SSS. --, therefor.

In Column 13, Line 30, delete "simultaneous" and insert -- simultaneously --, therefor.

In Column 13, Line 35, delete "of this" and insert -- this --, therefor.

In Column 13, Line 47, delete "may" and insert -- that may --, therefor.

In Column 14, Line 15, delete "uplink synchronization channel, USS," and insert -- uplink synchronization signal, USS, --, therefor.

CERTIFICATE OF CORRECTION (continued)
U.S. Pat. No. 11,818,674 B2

In Column 14, Line 39, delete "index the" and insert -- index as the --, therefor.

In Column 15, Line 7, delete "Uplink Synchronization Channel, USS," and insert -- Uplink Synchronization Signal, USS, --, therefor.

In Column 16, Line 3, delete "and based" and insert -- based --, therefor.

In Column 16, Lines 20-21, delete "communication circuitry 11," and insert -- radio communication interface 11, --, therefor.

In Column 17, Line 62, delete "obtaining 12" and insert -- obtaining S12 --, therefor.

In Column 18, Lines 62-63, delete "Network" and insert -- network --, therefor.

In Column 19, Line 12, delete "network)" and insert -- network --, therefor.